United States Patent [19]

Levine et al.

[11] 4,197,526
[45] Apr. 8, 1980

[54] MINIATURE PAGER RECEIVER WITH DIGITAL DISPLAY AND MEMORY

[76] Inventors: Alfred B. Levine, 2924 Terrace Dr.; Boris Haskell, 3715 Underwood St., both of Chevy Chase, Md. 20015

[21] Appl. No.: 839,175

[22] Filed: Oct. 4, 1977

Related U.S. Application Data

[60] Division of Ser. No. 718,609, Aug. 30, 1976, which is a continuation of Ser. No. 637,454, Dec. 3, 1975, abandoned.

[51] Int. Cl.² .................................. H04M 11/02
[52] U.S. Cl. .................................. 340/311
[58] Field of Search .................... 340/311, 312

[56] References Cited

U.S. PATENT DOCUMENTS

| 3,846,783 | 11/1974 | Apsell et al. | 340/311 |
| 3,918,000 | 11/1975 | Lain et al. | 340/311 |
| 3,984,775 | 10/1976 | Cariel et al. | 340/311 |
| 4,010,460 | 3/1977 | De Rosa | 340/311 |

Primary Examiner—James W. Moffitt
Attorney, Agent, or Firm—Alfred B. Levine

[57] ABSTRACT

A miniature receiver for a paging system having a digital display for displaying a received multi-digit number, and a memory for storing the received number to permit its retrieval and display at a later time. The received digital number may be automatically transferred into the memory and automatically retrieved upon command. Plural numbers may also be received successively displayed, and stored for later retrieval, in either an automatic or a manually controlled mode.

10 Claims, 3 Drawing Figures

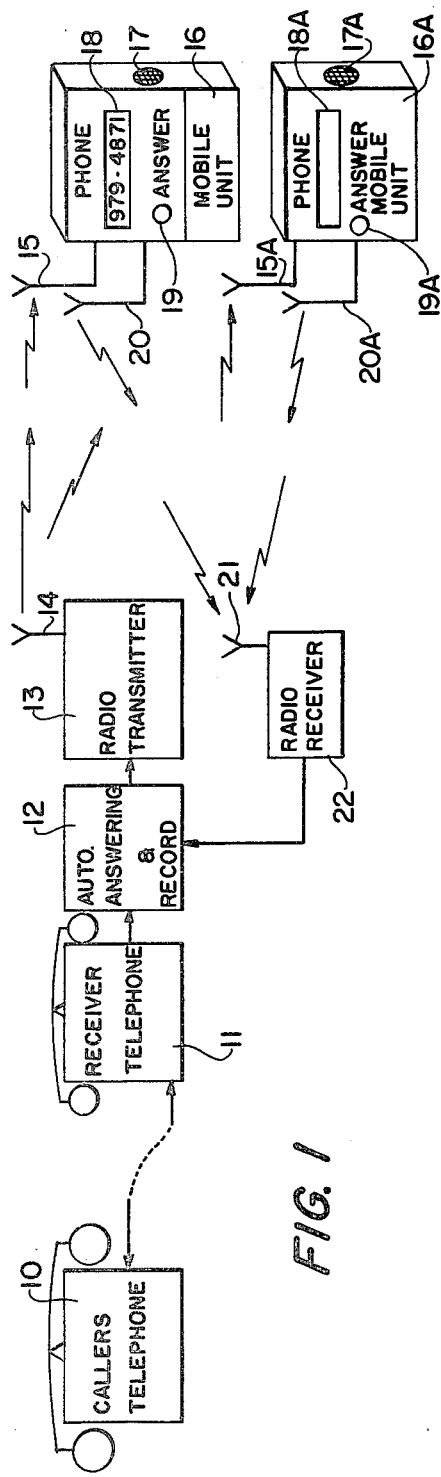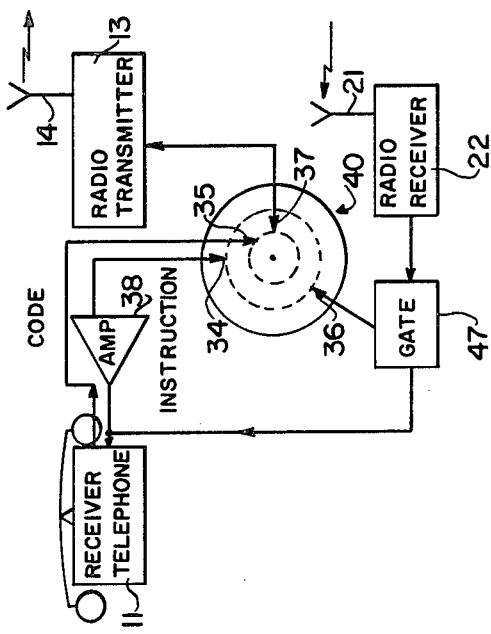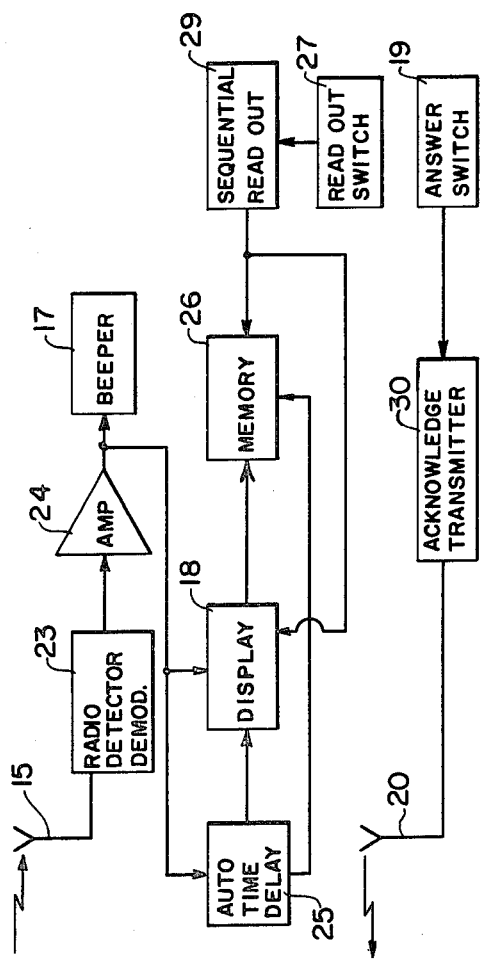

2

MINIATURE PAGER RECEIVER WITH DIGITAL DISPLAY AND MEMORY

CROSS REFERENCES TO RELATED APPLICATIONS

This application is a division of application Ser. No. 718,609, filed Aug. 30, 1976 which is a continuation of application Ser. No. 637,454, filed Dec. 3, 1975 now abandoned.

STATEMENT OF THE INVENTION

This invention relates to automatic communication systems employing the combination of wired communications means, such as telephones; automatic telephone answering systems; radiant energy transmitters, and portable mobile receivers, all being automatically combined in a telemetering arrangement to enable a person that is mobile and absent from the location of his own telephone receiver to directly obtain the telephone number or other coded message from a party calling his telephone.

BACKGROUND

It is presently well known to provide automatic telephone answering devices that automatically respond to telephone calls in the absence of the party being called to accept and record brief messages from the caller including the caller's name and telephone number. Such devices are also available that play back such recorded information over the phone to a different location of the party being called in response to a telephone command to do so, thereby enabling the party being called to receive the recorded telephone messages from a distant location without the need for returning to the home or office for obtaining such messages. However, available devices do not provide "real time" notification of the telephone calls and messages but instead rely upon "time delayed" recording of the messages, and periodic inquiry by the called party to the telephone answering device to determine if calls have been received in his absence and the message recorded.

It is also presently well known to remotely signal or to alert a person that is absent from the office that he is to return or telephone the office. Such signaling devices are generally provided in the form of a miniature mobile receiver being carried by the person and provided with an audible "beeper" or other alerting means, together with a radio or other radiant energy transmitter at the home or office that is operated to send the alerting or warning signal to the mobile radio receiver. Such signaling devices as have been used for this purpose require the presence of a person at the home or office location of the transmitter to both operate the transmitter as well as respond to any telephone call-back from the person being summoned or alerted by this signaling system so as to convey the messages to him.

SUMMARY OF THE INVENTION

In a preferred embodiment of the present invention, a completely automatic telephone system is provided that eliminates the need for human operator at the fixed location of the telephone being called, as well as eliminating the need for the party being called to call back the office or home to receive any messages. Instead, the party being called is not only alerted by a mobile receiver that the home or office has been called by telephone, but the mobile receiver also displays the telephone number of the party making the telephone call and/or other digitally coded message from the sender or calling party.

For performing these functions, there is provided at the receiver telephone, an automatic telephone answering device having a recorder and playback, that responds to each incoming call by instructing each caller to "dial" the calling telephone number. While the telephone connection between the calling and receiver telephone is "active", the dialing of such telephone number by the caller produces a corresponding digital code of pulses or tones over the telephone line to the receiver telephone, and this digital code is recorded by the automatic telephone answering devide. The modified telephone answering device thereupon automatically transmits this digitized telephone number by radio wave, or other form of radiant energy, to a miniature mobile receiver being carried by the remotely located party being called. Upon reception of the radiant signal, the receiver is activated to alert the party being called and the digital number being transmitted is indicated by an LED display or other suitable display. The party being called may thereupon directly return a telephone call to the calling party without first calling back the telephone answering device for instructions and information.

In a modified embodiment, the mobile receiver being carried by the party being called may also be provided with a radio or other wave transmitter for enabling the called party to acknowledge to the caller in "real time" that the telephone call has been received. In this embodiment, the mobile called party operates the acknowledgement transmitter to radiate a signal back to the telephone answering device; and the telephone answering device responds to such acknowledgement signal to playback a pre-recorded acknowledgement to the calling party while the calling party is still on the telephone line.

In both embodiments, the mobile party being called is immediately notified of his calls in "real time" as well as being notified of the telephone number of the calling party. In the second embodiment, the party making the call also receives an acknowledgement in "real time" that his call has been received and acknowledged by the party being called.

BRIEF DESCRIPTION OF THE DRAWINGS

FIG. 1 is an electrical schematic diagram illustrating the entire signaling system from the party calling by telephone to the mobile receiver of the party being called, FIG. 2 is an electrical block diagram illustrating further details of the invention together with a modified mobile receiver.

FIG. 3 is an electrical block diagram for illustrating details of the telephone answering and recording device.

DETAILED DESCRIPTION OF A PREFERRED EMBODIMENT

Referring to FIG. 1 of the drawings, a preferred system comprises a typical telephone answering device 12 of a type presently available on the open market, that is coupled to the telephone receiver 11 of the party being called in the usual fashion. Such known devices 12 generally include a tape or disc recorder (not shown in FIG. 1) for the purpose of both playing back prerecorded instructions to the caller as well as recording brief messages from the caller, including the caller's name and telephone number.

For communicating between the telephone answering device 12 and the mobile location of the party being called, the answering device employs a radio transmitter 13 and antenna 14, and the called party is provided with a miniaturized portable radio receiver 16 and antenna 15 that is normally carried in the caller's pocket or is attached to a belt or the like. Such transmitters and receivers are also presently available, and in use on the open market, in the form of a simplified radio system operating on a single carrier frequency, usually within the frequency range of the Citizen's Band. The receiver 16 is conventionally provided with an audible sound speaker, or beeper 17 to signal the mobile user whenever a properly modulated radio signal from the transmitter 13 has been picked up by the receiver 16.

At the fixed location of the telephone being called, the transmitter 13 is coupled to the recorder of the telephone answering device 12 and is triggered into operation by the answering device 12 following the reception of a telephone call from the calling party. Upon receiving a call, the radio signal being emitted by antenna 14 of transmitter 13 is propagated to the mobile receiver 16, and is suitably detected and amplified by the receiver 16 to energize the audible beeper 17, or to operate a flashing light, or to energize another type of alerting device for gaining the attention of the party being called. At this time, the remotely located party being called has been notified in "real time" by the mobile receiver 16 that a telephone call has just been received by the answering device 12 at the location of his home or office, and the party being called may immediately telephone back to his home telephone 11 and obtain a play-back of any recorded message from the caller that may have been recorded by the telephone answering device 12.

According to the present invention, however, the mobile receiver 16, transmitter 13, and automatic telephone answering device 12 are all preferably modified in such manner as to also provide at the mobile receiver 16, a visual display 18 of the telephone number of the calling party. This is performed by having the calling party record his calling telephone number in digital form (as a series of pulses or tones) that are recorded in the memory of the telephone answering device 12; and employing such recorded digital pulses to modulate the single frequency carrier of the radio transmitter 13 so as to transmit the telephone number in digital form to the receiver 16. At the receiver 16, the modulated pulses or digitized tones are detected, amplified, counted, and visually displayed at 18 so that the party being called is not only immediately notified of the fact that a telephone call has been made to his home or office but is additionally provided with the telephone number of the calling party that is displayed as a number 18 on the mobile receiver unit 16. Having this information, the party being called may promptly telephone back to the calling party thereby providing almost immediate "real time" communication between the calling party and the called party.

Alternatively, the mobile receiver unit 16 may be provided with a 10 digit digital memory, as is typically provided in hand calculators, for enabling the displayed telephone number to be transferred from the counter display 18 into memory storage for retrieval at a later time at the convenience of the called party. In this manner, a number of telephone inquiries that may be received at times when the mobile party being called does not choose to, or is unable to return the calls, may be retained and collected in storage for call back at a later time. To insure that received calls are not forgotten or overlooked by the called party, or are automatically recorded in the event that the called party is not alerted to the call when it is received, the mobile receiver unit also preferably incorporates an automatic time delay transfer circuit for automatically transferring each of the received numbers 18 into the memory of the unit after a suitable fixed time interval of one minute or so following each operation of the audible beeper 17. In this manner, it is not necessary for the party being called to continually respond to each calling party, or to manually write down or otherwise record the numbers, but instead, the user may "readout" the calling numbers from the memory at his convenience and respond to each of such calls as necessary.

FIG. 2 illustrates details of the automatic memory system as described above. As shown, each of the digitally modulated transmissions from transmitter 13 is received by mobile receiver antenna 15, detected at 23, and amplified at 24 to trigger into operation the audible signal "beeper" 17. The demodulated digital code of the calling number is also directed to the counter and display 18 for visually displaying the calling number as described above. Entry of the number into counter-display 18 also energizes an automatic time delay control circuit 25 to commence a preset time delay of about one minute following each visual display. Following the expiration of this time delayed display interval, the control circuit 25 energizes the memory 26 and enters the displayed calling number into memory circuit 26 from the counter-display 18. It also resets the counter-display 18 back into its initial condition for receiving the number of any subsequent caller. Resetting of the counter-display 18 also resets the audible signaler 17 to discontinue the audible signaling tone. This beeper 17 may also be manually disconnected or reset by the user at any time, as is known to those skilled in the art.

For subsequent readout of the stored telephone numbers from the memory 26, a sequential readout circuit 29 is manually energized by the user operating a command switch 27. The readout circuit 29 preferably includes a shift register (not shown) for sequentially interrogating each different position of the memory 26 in order in response to each succeeding manual actuation of the command switch 19 by the user. Each memory position being interrogated is sequentially interconnected with the counter-display 18 whereby each interrogation of a memory position results in the stored number being displayed by counter-display 18 for the user. Upon a subsequent actuation of the command switch 27, the counter-display 18 is reset and the stored telephone number in the next position of the memory 26 is displayed.

In a preferred mode-of-operation, the telephone answering device 12 responds to each phone call with a prerecorded message informing the caller that his call is being answered by an answering device 12 and instructing the caller to leave his name and to dial his calling number on the manually operated dial of his telephone. When dialing this number, the calling telephone emits a digital series of pulses corresponding to each digit of the phone number being dialed, or alternatively emits a different frequency tone for each digit. These digital signals are therefore conveyed over the telephone line to the receiver telephone and thense from the receiver phone to the recorder of the answering device 12. Such recorded digital signals are then applied to modulate the transmitter 13, thereby sending a modulated digital code to mobile receiver unit 16 where it is displayed at 18, as discussed above.

To provide a "real time" acknowledgement to the caller, notifying the caller that the call and the calling number have been received by the called party, the mobile receiver unit 16 may be provided with a fixed frequency acknowledgement transmitter 30 that is manually actuated to transmit by depressing on-off button 19 on the receiver unit. A fixed frequency acknowledgement receiver 22, provided at the telephone answering device 12, receives the acknowledgement signal from mobile unit 16 and energizes the playback unit of the answering device 12. The playback unit of answering device 12 responds to such energization by releasing a prerecorded audio message to the caller via telephones 11 and 10, informing the caller that the phone call has been transmitted to and received by the party being called along with the telephone number of the calling party, and that a return telephone call will be made.

FIG. 3 schematically illustrates the above described features of the telephone answering device as coupled to both the receiver telephone 12, the transmitter 13, and receiver 22. As shown, the answering device 12 includes a recorder 40 that may be a magnetic disc recorder or other suitable type, having a series of transducer heads 34, 35, 36, and 37 and disc record 40. Transducer head 34 plays back prerecorded audio messages of instruction to the caller via telephones 12 and 10. Transducer head 35 records the calling telephone number in digital form on a separate track of the record 40; head 37 plays back the digitally recorded telephone number to the transmitter; and finally head 36 plays back a prerecorded audio message to the caller acknowledging that the call has been received by the called party. A suitable gate 47 is provided in the circuit interconnecting the prerecorded audio acknowledgement transducer 36 with the phone 12, and gate 47 is closed in response to the radio receiver 22 detecting the receipt of a radio signal of acknowledgement from the mobile transmitter, enabling the audio acknowledgement message to be sent to the calling party.

As will be appreciated by those skilled in this art, many changes may be made without departing from the invention. For example, in the event that the mobile receiver is used inside of a building such as a hospital, a magnetic wave apparatus may be used instead of an electromagnetic radio wave. At the mobile receiver, an automatic read out of the telephone numbers from the memory may be used instead of the described sequential read out by use of a switch and shift register circuit. Still further, a single answering telephone and telephone answering device 12 may be employed to relay telephone call information to a plurality of remotely located mobile stations. To distinguish between such different mobile stations, the calling party can be additionally instructed to dial into his telephone, a different code number for each different person to be called. For example, if the caller wishes to place a call to "Jones", he is instructed by the prerecorded message to dial the number "1" preceeding the dialing of his telephone number. If he wishes "Smith", he is instructed to dial "2"; or if "Thompson" then to dial "3". In a well known manner, each mobile receiver may be made responsive to a different first digit of a received code, whereby Jones' receiver responds only to a code number preceeded by the number "1", Smith by the number "2" and the like. Since these any other changes may be made without departing from this invention, this inventionl should be considered as limited only by the following claims:

We claim:

1. In a portable page receiver responsive to transmitted message signals, each message containing a digitized multi-digit number,
   alarm means for alerting the user of the page receiver of the arrival of a message,
   video display means for visually displaying the number,
   an electronic memory for off-line storage of the number, and having sufficient capacity for storing more than said number,
   means for initially actuating said alarm means and substantially concurrently displaying said multi-digit number in said video display means upon the arrival of a message,
   time delay means for automatically transferring the displayed number into the memory and resetting the video display in the absence of a response from the user of the page receiver after the number has been displayed for a period of time,
   and means for recalling from the memory into the video display means the stored multi-digit number for subsequent visual display.

2. In the receiver of claim 1, said alarm means being operated upon the reception of each signal containing a multi-digit number,
   time delayed automatic means for transfering each received number into the memory and resetting the display to receive a subsequent signal,
   and means for successively reading out and displaying said stored numbers at a later time.

3. In the device of claim 1, said memory having sufficient capacity for storing a plurality of said numbers.

4. In the page receiver of claim 3, means for automatically storing a plurality of sequentially received numbers in said memory.

5. In the page receiver of claim 1, said memory having sufficient capacity for storing a plurality of numbers in response to successively transmitted signals, and means for successively reading out and displaying said stored telephone numbers at a later time.

6. In the receiver of claim 1, said page receiver including an acknowledgement transmitter for notification that the transmitted signal has been received.

7. In the receiver of claim 1, means for disabling the alarm means while permitting the reception of the signal containing the multi-digit number.

8. In the receiver of claim 1, said memory having sufficient capacity for storing a plurality of multi-digit numbers,
   means for sequentially storing a plurality of received signals containing multi-digit numbers,
   and means under control of the user for sequentially reading out said stored numbers from the memory to the video display.

9. In the receiver of claim 8, said means for sequentially reading out said stored numbers from the memory including automatically operating means initiated by the user.

10. In the receiver of claim 8, means for disabling the alarm means while permitting the reception and automatic storage of a plurality of sequentially received signals containing multi-digit numbers.

* * * * *